United States Patent
Koh et al.

(10) Patent No.: US 8,804,307 B2
(45) Date of Patent: Aug. 12, 2014

(54) HIGHLY DIELECTRIC FILM HAVING HIGH WITHSTANDING VOLTAGE

(75) Inventors: Meiten Koh, Settsu (JP); Kouji Yokotani, Settsu (JP); Miharu Matsumura, Settsu (JP); Eri Mukai, Settsu (JP); Nobuyuki Komatsu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 400 days.

(21) Appl. No.: 12/524,283

(22) PCT Filed: Jan. 24, 2008

(86) PCT No.: PCT/JP2008/050971
§ 371 (c)(1),
(2), (4) Date: Jul. 23, 2009

(87) PCT Pub. No.: WO2008/090947
PCT Pub. Date: Jul. 31, 2008

(65) Prior Publication Data
US 2010/0110609 A1    May 6, 2010

(30) Foreign Application Priority Data
Jan. 26, 2007  (JP) .................................. 2007-017117

(51) Int. Cl.
| H01G 4/08 | (2006.01) |
| H01G 4/06 | (2006.01) |
| H01G 4/20 | (2006.01) |
| C09D 127/16 | (2006.01) |
| C08J 5/18 | (2006.01) |

(52) U.S. Cl.
CPC .............. *H01G 4/206* (2013.01); *C08J 2327/16* (2013.01); *C09D 127/16* (2013.01); *C08J 5/18* (2013.01)
USPC .......................................... 361/323; 361/311

(58) Field of Classification Search
USPC ....................... 361/311, 323, 321.6
See application file for complete search history.

(56) References Cited

U.S. PATENT DOCUMENTS

| 4,302,408 | A |   | 11/1981 | Ichihara et al. |
|---|---|---|---|---|
| 4,435,475 | A | * | 3/1984 | Sasaki et al. .................. 428/409 |
| 4,592,949 | A | * | 6/1986 | Mizuno et al. ................. 442/189 |
| 4,615,943 | A | * | 10/1986 | Sakagami et al. ............. 428/332 |
| 6,475,663 | B1 |   | 11/2002 | Möhwald et al. |

FOREIGN PATENT DOCUMENTS

| EP | 315708 A1 | * | 5/1989 |
|---|---|---|---|
| EP | 0423402 A1 |   | 4/1991 |
| JP | 60-6220 A |   | 2/1985 |
| JP | 60-40137 A |   | 3/1985 |
| JP | 62286720 A | * | 12/1987 |
| JP | 01-266145 A |   | 10/1989 |
| JP | 07-192965 A |   | 7/1995 |
| JP | 2002-522872 A |   | 7/2002 |

\* cited by examiner

*Primary Examiner* — Eric Thomas
(74) *Attorney, Agent, or Firm* — Sughrue Mion, PLLC

(57) ABSTRACT

The present invention relates to a highly dielectric film formed by using (A) a fluorine-containing resin comprising vinylidene fluoride unit and tetrafluoroethylene unit in a total amount of not less than 95% by mole, and provides a film for a film capacitor which has high dielectric property and high withstanding voltage and can be made thin.

3 Claims, No Drawings

HIGHLY DIELECTRIC FILM HAVING HIGH WITHSTANDING VOLTAGE

TECHNICAL FIELD

The present invention relates to a highly dielectric film being suitable for a film capacitor.

BACKGROUND ART

Generally, energy E of a film capacitor is represented by the equation (1):

$$E = (1/2)CV^2 = (1/2)\in(S/d)V^2 \quad (1)$$

wherein C represents a capacity of a capacitor, and $\in$ represents a dielectric constant, S represents a surface area of a film, d represents a film thickness and V represents a withstanding voltage. Therefore, in order to increase energy of a film for a film capacitor, increase in dielectric constant and withstanding voltage and decrease in film thickness are demanded.

So far, the use of vinylidene fluoride (PVdF) has been proposed for a film for a film capacitor from the viewpoint of its high dielectric constant (for example, cf. JP56-162822A). Also, there is disclosed a method of producing a film for a film capacitor by a coating method since it is easy to make a film thin (for example, cf. JP60-40137A and JP59-62115A). On the other hand, there is disclosed a method of using a copolymer comprising vinylidene fluoride (VdF), ethylene and tetrafluoroethylene (TFE) (for example, cf. JP59-226409A and JP59-230208A).

As mentioned above, various proposals have been made, but a thinner film having both of a higher dielectric constant and a higher withstanding voltage is desired.

DISCLOSURE OF INVENTION

It is an object of the present invention to provide a film which has high dielectric property and a high withstanding voltage and can be made thin.

The present invention relates to a highly dielectric film formed by using (A) a fluorine-containing resin comprising vinylidene fluoride unit and tetrafluoroethylene unit in a total amount of not less than 95% by mole.

It is preferable that the above-mentioned fluorine-containing resin (A) is a copolymer comprising 60 to 95% by mole of vinylidene fluoride unit and 5 to 40% by mole of tetrafluoroethylene unit.

The above-mentioned highly dielectric film may further comprise (B) at least one kind of polymer selected from the group consisting of polyvinylidene fluoride, vinylidene fluoride/hexafluoropropylene copolymer, polycarbonate, polyethylene oxide, polypropylene oxide, poly(meth)acrylate and polyvinyl acetate.

The above-mentioned highly dielectric film may further comprise (C) silica in an amount of 0.01 to 10 parts by mass based on 100 parts by mass of the fluorine-containing resin (A).

The above-mentioned highly dielectric film may be prepared by stretching treatment after forming into a film by melt-extrusion or may be prepared by a coating method.

It is preferable that the above-mentioned highly dielectric film is a film for a film capacitor.

Also the present invention relates to a film capacitor prepared by laminating an electrode layer on at least one surface of the above-mentioned highly dielectric film.

BEST MODE FOR CARRYING OUT THE INVENTION

First, the highly dielectric film of the present invention is explained below.

The highly dielectric film of the present invention is a film formed by using (A) a VdF/TFE type fluorine-containing resin comprising vinylidene fluoride (VdF) unit and tetrafluoroethylene (TFE) unit in a total amount of not less than 95% by mole.

In the VdF/TFE type fluorine-containing resin (A), the total amount of VdF unit and TFE unit is not less than 95% by mole, preferably not less than 96% by mole, more preferably not less than 98% by mole, especially preferably 100% by mole.

In the VdF/TFE type fluorine-containing resin (A), it is preferable that the amount of VdF unit is 60 to 95% by mole and the amount of TFE unit is 5 to 40% by mole, especially preferably the amount of VdF unit is 70 to 90% by mole and the amount of TFE unit is 10 to 30% by mole, from the viewpoint that a withstanding voltage is high and a thin film can be obtained. The VdF/TFE type fluorine-containing resin (A) may be any of a random copolymer and a block copolymer, and a block copolymer is preferred.

The VdF/TFE type fluorine-containing resin (A) may contain an optional monomer copolymerizable with the VdF unit and the TFE unit to such an extent not to impair the effect thereof. Examples of preferred monomers are chlorotrifluoroethylene (CTFE), hexafluoropropylene (HFP) and those derived from compounds represented by the general formula (I):

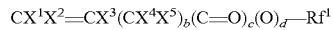

$$CX^1X^2{=}CX^3(CX^4X^5)_b(C{=}O)_c(O)_d{-}Rf^1$$

wherein $X^1$ and $X^2$ are the same or different and each is —H or —F; $X^3$ is —H, —F, —CH$_3$ or —CF$_3$; $X^4$ and $X^5$ are the same or different and each is —H, —F or —CF$_3$; b is 0 or 1; $Rf^1$ is a fluorine-containing alkyl group which has 1 to 12 carbon atoms and may have ether bond (more preferably perfluoro(1,1,1-trihydro-hexene), perfluoro(1,1,5-trihydro-1-pentene)).

Since the VdF/TFE type fluorine-containing resin (A) has the specific composition mentioned above, a highly dielectric film having a higher dielectric constant and a higher withstanding voltage as compared with prior arts can be formed, and in addition, since the resin has high solubility in a coating solvent, a highly dielectric film can be made thinner, for example, by a coating method.

In the present invention, for preparing the VdF/TFE type fluorine-containing resin (A), any of known polymerization methods such as a solution polymerization method, a suspension polymerization method (dispersion polymerization method) and an emulsion polymerization method can be adopted, and also, a polymerization initiator to be used can be optionally selected from those which have been generally used, depending on a polymerization method.

Examples of a polymerization initiator are, for instance, organic peroxides such as bis(chlorofluoroacyl)peroxide, bis(perfluoroacyl)peroxide, bis(ω-hydroperfluoroacyl)peroxide, t-butyl peroxyisobutyrate and diisopropyl peroxydicarbonate; azo compounds such as azobis isobutyronitrile; ammonium persulfate, and the like. The amount of polymerization initiator can be optionally changed depending on kind thereof, conditions for polymerization reaction, and the like, and is usually 0.005 to 5% by weight, especially 0.05 to 0.5% by weight, based on the whole monomers to be polymerized.

The conditions for polymerization reaction can be selected from a wide range of reaction conditions without particular limitation. For example, an optimum temperature for the polymerization reaction can be selected depending on kind of a polymerization initiator, and usually 0° C. to about 100° C., especially about 30° C. to about 90° C. can be adopted. A reaction pressure also can be optionally selected, and is usually 0.1 to 5 MPa, especially about 0.5 MPa to about 3 MPa. In the VdF/TFE type fluorine-containing resin (A) used in the present invention, polymerization can be carried out advantageously under the above-mentioned reaction pressure, and may be carried out under higher pressure or under reduced pressure. In addition, the polymerization can be carried out batchwise or continuously.

In addition, a chain transfer agent can be used for the purpose of adjusting the molecular weight of the VdF/TFE type fluorine-containing resin (A). A usual chain transfer agent can be used, and examples thereof are hydrocarbons such as n-hexane and cyclohexane; aromatics such as toluene and xylene; ketones such as acetone; acetic esters such as ethyl acetate and butyl acetate; alcohols such as methanol and ethanol; mercaptans such as methyl mercaptan, and the like. The amount thereof can be changed depending on a chain transfer constant of the compound to be used, and is usually within a range from 0.01 to 20% by weight based on the solvent used for polymerization.

With respect to the solvent used for polymerization, a conventional liquid solvent can be used according to the polymerization method. From the viewpoint of satisfactory transparency and heat resistance of the obtained resin film, it is preferable that the VdF/TFE type fluorine-containing resin (A) used in the present invention is subjected to suspension polymerization (dispersion polymerization) in the presence of a fluorine-containing solvent.

A lower limit of the weight average molecular weight of the VdF/TFE type fluorine-containing resin (A) used in the present invention is 10,000, preferably 50,000, and an upper limit thereof is 400,000, preferably 350,000. An upper limit of the crystalline melting point thereof measured at the 2nd heat-up within a temperature range from 0° C. to 250° C. at 10 mg of a sample weight at a temperature elevating rate of 10° C./min is 200° C., preferably 150° C., and a lower limit thereof is 100° C., preferably 120° C.

The dielectric constant (20° C., 1 kHz) of the VdF/TFE type fluorine-containing resin (A) is preferably not less than 7, especially preferably not less than 7.5, from the point of further increasing the dielectric constant of a film.

The highly dielectric film of the present invention may contain other polymer (B) in addition to the VdF/TFE type fluorine-containing resin (A). Examples of preferred other polymer (B) are polycarbonate (PC), polyester, polyethylene terephthalate (PET), polyethylene naphthalate (PEN), silicone resin, polyether, polyvinyl acetate, polyethylene and polypropylene (PP) for improving flexibility; polyvinylidene fluoride (PVdF), VdF/HFP copolymer, poly(meth)acrylate, epoxy resin, polyethylene oxide, polypropylene oxide, polyphenylene oxide (PPO), polyphenylene sulfide (PPS), polyamide (PA), polyimide (PI), polyamide imide (PAI), PC, polystyrene and polybenzimidazole (PBI) for increasing strength; and odd number polyamide, cyano pullulan, and copper phthalocyanine polymer for supplementing high dielectric property.

Among these, at least one kind of polymer selected from the group consisting of PVdF, VdF/HFP copolymer, PC, polyethylene oxide, polypropylene oxide, poly(meth)acrylate and polyvinyl acetate is preferred from the viewpoint of high affinity for the VdF/TFE type fluorine-containing resin (A). PVdF and VdF/HFP copolymer are especially preferred from the viewpoint that mechanical strength can be improved without impairing dielectric constant. Also, PC, polyethylene oxide, polypropylene oxide, poly(meth)acrylate and polyvinyl acetate are especially preferred from the viewpoint of improvement in mechanical strength and insulation resistance.

These other polymers (B) can be mixed to such an extent not impair high withstanding voltage and high dielectric constant which are characteristics of the VdF/TFE type fluorine-containing resin (A), and it is preferable that the ratio of the fluorine-containing resin (A)/other polymer (B) is 30/70 to 100/0 (mass %), preferably 70/30 to 100/0 (mass %).

The silica (C) is a representative processability improving agent, and may be contained since blocking of a film can be prevented without impairing mechanical strength of a film. The amount thereof is preferably 0.01 to 10 parts by mass, especially preferably 0.1 to 5 parts by mass based on 100 parts by mass of the VdF/TFE type fluorine-containing resin (A). From the viewpoint of inhibiting lowering of withstanding voltage, an upper limit thereof is preferably 2 parts by mass based on 100 parts by mass of the fluorine-containing resin (A).

In the high dielectric film of the present invention, the use of highly dielectric inorganic particles is not prohibited, and further, additives such as other reinforcing filler and affinity improving agent may be contained as optional components to such an extent not to impair the effect of the present invention.

Examples of highly dielectric inorganic particles are barium titanate oxide particles or strontium titanate oxide particles. It is preferable to blend the highly dielectric inorganic particles in an amount of 10 to 200 parts by mass based on 100 parts by mass of the fluorine-containing resin (A).

When barium titanate oxide particles are contained, dielectric constant is increased, but increase in dielectric loss and decrease in withstanding voltage are seen. Therefore, with respect to the amount of barium titanate oxide particles, an upper limit thereof is about 200 parts by mass based on 100 parts by mass of the VdF/TFE type fluorine-containing resin (A), and in that case, dielectric constant is about 50 to about 70. In addition, the amount of barium titanate oxide particles is preferably not less than 10 parts by mass from the viewpoint of an effect of improvement in dielectric constant.

When strontium titanate oxide particles are contained, there are increase in dielectric constant and decrease in dielectric loss, which is preferred. On the other hand, since a withstanding voltage is decreased, it is better not to blend strontium titanate oxide particles when aiming at improvement in a withstanding voltage.

Examples of other reinforcing filler are particles or fibers of silicon carbide, silicon nitride, magnesium oxide, potassium titanate, glass, alumina and boron compounds, and examples of an affinity improving agent are, for instance, polyolefin modified with functional group, styrene-modified polyolefin, polystyrene modified with functional group, polyacrylate imide and cumyl phenol. These may be blended to an extent not to impair the effect of the present invention. It is more preferable not to blend these components, from the viewpoint of a withstanding voltage.

The film for a film capacitor of the present invention can be formed by a melt-kneading method (1) and a coating method (2) by using the VdF/TFE type fluorine-containing resin (A) explained above (encompassing the VdF/TFE type fluorine-containing resin composition containing, as case demands, each component explained above hereinafter the same). From the viewpoint of easy production and excellent homogeneity of an obtained film, it is advantageous to produce by the coating method (2), in the case of blending highly dielectric inorganic particles.

In addition, the film produced by the method (1) or (2) can be made thinner by stretching treatment. While the stretching can be made at normal temperature (room temperature), it is preferable to carry out the stretching at a temperature of not less than 40° C., preferably not less than 80° C. and not more than 200° C., preferably not more than 160° C., from the viewpoint of satisfactory moldability and excellent homogeneity of a film thickness.

For the coating, a knife coating method, a cast coating method, a roll coating method, a gravure coating method, a blade coating method, a rod coating method, an air doctor coating method, a curtain coating method, a Faknelane coating method, a kiss coating method, a screen coating method, a spin coating method, a spray coating method, an extrusion coating method, and an electrodeposition coating method can be employed. Among these, a roll coating method, a gravure coating method and a cast coating method are preferred from the viewpoint that operation is easy, non-uniformity of a film thickness is small and productivity is satisfactory.

For the coating, an optional solvent being capable of dissolving the VdF/TFE type fluorine-containing resin (A) can be used, and especially polar organic solvents are preferred. Among polar organic solvents, for example, ketone solvents, ester solvents, carbonate solvents, cyclic ether solvents and amide solvents are preferred. Preferred examples are methyl ethyl ketone, methyl isobutyl ketone (MIBK), acetone, diethyl ketone, dipropyl ketone, ethyl acetate, methyl acetate, propyl acetate, butyl acetate, ethyl lactate, dimethyl carbonate, diethyl carbonate, dipropyl carbonate, methyl ethyl carbonate, tetrahydrofuran, methyl tetrahydrofuran, dioxane, dimethylformamide (DMF) and dimethylacetamide.

In the thus obtained film for a film capacitor of the present invention, since solubility of the VdF/TFE type fluorine-containing resin (A) in the solvent is high and the coating is easy, the film thickness can be not more than 20 μm, preferably not more than 15 μm, further not more than 10 μm. A lower limit of the film thickness is about 2 μm from the point of maintaining mechanical strength.

In addition, even in the case of producing the film for a film capacitor of the present invention by the coating method, its withstanding voltage can be not less than 300 V/μm, preferably not less than 350 V/μm, further not less than 400 V/μm by using the VdF/TFE type fluorine-containing resin (A) having the specific composition mentioned above.

In the film for a film capacitor of the present invention, dielectric loss (10 kHz) can be decreased to 5 or less, further 3 or less.

Further, in the film capacitor or composite film further comprising silica and highly dielectric inorganic fine particles according to the present invention, a higher dielectric constant of the film is desirable since electrostatic capacity is increased, and a proper range of a dielectric constant can be selected in consideration of dielectric loss and withstanding voltage. When the VdF/TFE type fluorine-containing resin (A) is used as in the present invention, dielectric constant of the film is about 7 to about 12, which is very high as compared with a dielectric constant of 2.2 in the case of using PP which is generally used on a film for a film capacitor and a dielectric constant of 3 in the case of using PET. When the proportion of TFE in the VdF/TFE type fluorine-containing resin (A) is increased, a dielectric constant tends to be lower, and dielectric loss also decreases. Therefore, it is desirable that an upper limit of the proportion of TFE is 40% by mole and a lower limit of the dielectric constant is 7. This is because even if dielectric constant is not more than 7, dielectric loss is maintained constant.

On the surface of the film for a film capacitor of the present invention can be formed an electrode or the like by vapor deposition method. With respect to a material of the electrode and a method and conditions for forming the electrode, known materials, methods and conditions can be adopted.

Then, the film capacitor of the present invention is explained below.

The film capacitor of the present invention can be obtained by laminating an electrode layer on the above-mentioned highly dielectric film.

Examples of a structure of a film capacitor are a laminated type prepared by laminating electrode layers and highly dielectric films alternately (JP63-181411A, JP3-18113A) and a rolled type prepared by rolling an electrode layer and a highly dielectric film in the form of tape (one disclosed in JP60-262414A, in which an electrode is not laminated continuously on a highly dielectric film, and one disclosed in JP3-286514A, in which an electrode is laminated continuously on a highly dielectric film). In the case of a rolled type film capacitor which is prepared by laminating an electrode continuously on a highly dielectric film, has a simple structure and is produced relatively easily, generally the capacitor is produced by rolling two highly dielectric films having an electrode laminated on one surface thereof so that the electrodes do not come into contact to each other, and then, if necessary, fixing the films not to get loose after the rolling.

The electrode layer is not limited particularly, and is a layer generally made of a conductive metal such as aluminum, zinc, gold, platinum or copper and used in the form of a metal foil or a deposition metal film. In the present invention, either a metal foil or a deposition metal film may be used or the both may be used together. Usually a deposition metal film is preferred since an electrode layer can be made thin, and as a result, capacity can be increased for its volume, adhesion to a dielectric film is excellent and unevenness of thickness is small. A deposition metal film is not limited to a single layer, and if necessary, may be a multi-layer prepared, for example, by a method of preparing an electrode layer by forming a semi-conductive aluminum oxide layer on an aluminum layer for giving moisture resistance (for example, JP2-250306A). A thickness of a deposition metal film also is not limited particularly, and is preferably within a range from 100 to 2,000 angstrom, more preferably within a range from 200 to 1,000 angstrom. The thickness of a deposition metal film within this range is suitable since capacity and strength of the capacitor are balanced.

When a deposition metal film is used as an electrode layer, a method of film formation is not limited particularly, and for example, a vacuum deposition method, a sputtering method, an ion plating method or the like can be adopted. Usually a vacuum deposition method is used.

Examples of a vacuum deposition method are a batch type for molded articles and a semi-continuous type and continuous (air to air) type for long articles, and currently a semi-continuous type vacuum deposition is mainly employed. A semi-continuous type metal deposition method is a method of carrying out metal deposition and rolling of a film in a vacuum system, bringing the vacuum system to air system, and then taking out the deposited film.

Specifically a semi-continuous type method can be carried out by a method described in Japanese Patent No. 3664342 in reference to FIG. 1.

In the case of forming a thin metal film layer on a highly dielectric film, the surface of the highly dielectric film can be previously subjected to corona treatment, plasma treatment or the like for improvement in adhesion. Also in the case of using a metal foil as an electrode layer, a thickness of the metal foil is not limited particularly, and is usually 0.1 to 100 μm, preferably 1 to 50 μm, more preferably 3 to 15 μm.

A fixing method is not limited particularly, and both of fixing and protection of a structure may be carried out at the same time, for example, by sealing with a resin or by putting in an insulation case and then sealing. A lead wire connection method also is not limited particularly, and the lead wire is fixed by welding, ultrasonic pressure welding or forge welding or with an adhesive tape. A lead wire may be connected to an electrode before rolling a film. In the case of putting in an insulation case with sealing, if necessary, an opening may be sealed with a thermosetting resin such as urethane resin or epoxy resin to prevent degradation by oxidation.

The thus obtained film capacitor of the present invention has high dielectric property and high withstanding voltage and can be made thin.

EXAMPLE

The present invention is then explained by means of examples, but is not limited to them.

The characteristic values used in the specification of the present invention are measured by the following methods.
(Nmr Analysis)
NMR measuring equipment: available from BRUKER
$^1$H-NMR measuring condition:
300 MHz (tetramethylsilane=0 ppm)
$^{19}$F-NMR measuring condition:
282 MHz (trichlorofluoromethane=0 ppm)
(Melting Point)
A melting point is confirmed by measuring with DSC under the following conditions.
(Conditions for Measuring with Dsc)
Heat-up and cooling rate: 10° C./min
Sample amount: 10 mg
Measuring temperature range: from 0° C. to 250° C.
Measuring cycle: 1st heat-up→1st cooling→2nd heat-up A crystalline melting peak temperature derived from a VdF/TFE type fluorine-containing resin at 2nd heat-up is assumed to be a melting point.
(Weight Average Molecular Weight)
HLC-8010 available from Toso Kabushiki Kaisha is used as measuring equipment, and tetrahydrofuran (THF) is used as a moving phase and three columns 4HXL, 3HXL and GMHXL of styrene/divinyl benzene copolymer type are used.
(Withstanding Voltage)
Withstanding voltage of an obtained thin film is measured according to JIS-C2330 with a withstanding voltage·insulation resistance tester (TOS9201) available from KIKUSUI ELECTRONICS CORP.

Namely, a lower electrode is one prepared by putting an about 2 mm thick rubber sheet having a rubber Shore hardness of about 60 degrees on a proper size of metallic sheet and placing a 7 μm thick aluminum foil provided in JIS-H4160 thereon, and an upper electrode is a brass cylinder of 25 mm diameter and about 500 g mass having a smooth base surface being free from flaw and about 3.0 mm roundness on its circumference.

The thin film is placed on the lower electrode, the upper electrode is placed thereon, and then, in the atmosphere of 20±5° C. and 50±5% of a relative humidity, d.c. voltage is applied between the both electrodes at a rate of 100 V/sec from 0 V until breakage occurs.

A withstanding voltage is measured at 12 to 18 points per one film, and an average thereof is assumed to be a withstanding voltage.
(Dielectric Constant and Dielectric Loss)
By using a highly dielectric film formed on an aluminum sheet, aluminum is deposited in vacuo at an area of 95 mm$^2$ on the highly dielectric film surface opposite to the aluminum sheet, to prepare a sample. A dielectric constant and dielectric loss of this sample are measured at room temperature (25° C.) at a frequency of 100 Hz, 1 kHz, 10 kHz and 100 kHz with an impedance analyzer (HP4194A available from Hewlett Packard Company).
(Film Thickness)
A thickness of a film on a substrate is measured at room temperature using a film thickness meter (CMI223 available from Oxford Instruments) subjected to zero point adjustment depending on a substrate and calibration with two-point reference thicknesses.
(Tensile Strength)
A tensile strength is measured according to JIS K7113 with a kinetic visco-elasticity meter (RSA-II available from Reometrics Inc.) by using 20 mm wide samples prepared from films of Examples 1 and 2. Tension is applied at a rate of 50 mm/min.

Synthesis Example 1

Vdf/Tfe Type Fluorine-Containing Resin 1

Into a 6-liter stainless steel autoclave were poured 3,000 g of deionized water and 6 g of ammonium perfluorooctanoate as an emulsifying agent, and then application of pressure with nitrogen gas and deaeration were repeated three times to remove dissolved oxygen. The inside temperature was maintained at 80° C. with stirring, and a pressurized gas mixture of VdF/TFE=82/18 (molar ratio) was introduced to maintain the inside pressure of the autoclave at 1.3 MPa. Then, 4 g of ethyl acetate and 6 g of 10% aqueous solution of ammonium persulfate as a polymerization initiator were introduced under pressure, and reaction started.

As the reaction proceeded, the inside pressure decreased, and therefore, the pressurized gas mixture was additionally introduced to maintain the inside pressure of the autoclave. After 6-hour reaction, the stirring was stopped, and un-reacted monomers were removed by purging to terminate the polymerization.

Into a white dispersion produced in the autoclave was added 1 liter of 10% aqueous solution of ammonium carbonate for coagulation, and after washing the obtained polymer with water, it was dried at 120° C. for 12 hours to obtain 480 g of a VdF/TFE type fluorine-containing resin 1.

By using this VdF/TFE type fluorine-containing resin 1, analysis of composition by NMR, measurement of a melting point by DSC and measurement of a weight average molecular weight by GPC were carried out, and the results are shown below.
Composition by NMR: VdF/TFE=80/20 (molar percent)
Melting point: 126° C.
Weight average molecular weight: 150,000

Synthesis Example 2

Vdf/Tfe Type Fluorine-Containing Resin 2

A VdF/TFE type fluorine-containing resin 2 was prepared by polymerization in the same manner as in Synthesis Example 1 except that a gas mixture of VdF/TFE=84/16 was used and the amount of ethyl acetate was changed to 2 g.

By using this VdF/TFE type fluorine-containing resin 2, analysis of composition by NMR, measurement of a melting point by DSC and measurement of a weight average molecular weight by GPC were carried out, and the results are shown below.
Composition by NMR: VdF/TFE=82/18 (molar percent)
Melting point: 134° C.
Weight average molecular weight: 320,000

Example 1

The fluorine-containing resin 1 prepared by polymerization in Synthesis Example 1 was dissolved in methyl ethyl ketone (MEK) to give a concentration of 20% by mass. Next, the solution was coated on an aluminum sheet with a bar coater, followed by drying at 120° C. for 2 minutes with a hot air dryer to obtain a highly dielectric film of the present invention, and physical properties were measured. The results are shown in Table 1.

Example 2

A highly dielectric film of the present invention was prepared in the same manner as in Example 1 except that the fluorine-containing resin 2 prepared by polymerization in Synthesis Example 2 was used as a fluorine-containing resin, and physical properties were measured. The results are shown in Table 1.

Example 3

A highly dielectric film of the present invention was prepared in the same manner as in Example 1 except that a fluorine-containing resin composition comprising the fluorine-containing resin 2/KYNAR 761 (PVdF homopolymer available from Elf Atochem North America Inc.)=70/30 (mass %) was used instead of the fluorine-containing resin 1 and dimethylformamide (DMF)/methyl isobutyl ketone (MIBK)/THF=30/50/20 in mass % was used as a solvent instead of MEK, and physical properties were measured. The results are shown in Table 1.

Example 4

A highly dielectric film of the present invention was prepared in the same manner as in Example 1 except that a fluorine-containing resin composition comprising the fluorine-containing resin 2/KYNAR 761=90/10 (mass %) was used instead of the fluorine-containing resin 1, and physical properties were measured. The results are shown in Table 1.

Example 5

To 50 parts by mass of MEK were added 50 parts by mass of spheroidal silica fine powder (SP-0.3B available from FUSO CHEMICAL CO., LTD.) and 2.5 parts by mass of SIM6487.4 (available from AZmax Co.) as a silane coupling agent.

This mixture and glass beads (GB503M available from Potters-Ballotini Co., Ltd.) in the same mass amount as that of the mixture were poured in a three drum type sand grinder (A.VIEX available from AIMEX), followed by 60-minute dispersing treatment at room temperature at 1,000 rpm. After the dispersing treatment, the mixture was passed through a stainless steel mesh to remove glass beads.

This dispersion of silica was added to 20% by mass MEK solution of the fluorine-containing resin 2 so that the silica content became 0.1% by mass based on the fluorine-containing resin 2. Then the obtained mixture was coated on an aluminum substrate with a bar coater, and thereafter, a highly dielectric film of the present invention was prepared in the same manner as in Example 1, and physical properties were measured. The results are shown in Table 1.

Comparative Example 1

KYNAR 761 was dissolved in a solution of DMF/MIBK=60/40 to give a concentration of 20% by mass. This solution of KYNAR 761 was coated on an aluminum substrate with a bar coater, and thereafter, a film was prepared in the same manner as in Example 1, and physical properties were measured. The results are shown in Table 1.

Comparative Example 2

A film was prepared in the same manner as in Comparative Example 1 except that KYNAR 2801 (VdF/hexafluoropropylene (HFP) copolymer) was used instead of KYNAR 761, and physical properties were measured. The results are shown in Table 1.

TABLE 1

|  | Example | | | | | Comparative Example | |
| --- | --- | --- | --- | --- | --- | --- | --- |
|  | 1 | 2 | 3 | 4 | 5 | 1 | 2 |
| Withstanding voltage (V/μm) | 480 | 510 | 390 | 440 | 340 | 290 | 320 |
| Dielectric constant | 11 | 11 | 10.5 | 10.8 | 10.1 | 10 | 11 |
| Dielectric loss | 2.6 | 2.4 | 2.7 | 2.6 | 2.0 | 2.8 | 3.4 |
| Film thickness (μm) | 5.5 | 4.9 | 5 | 4.8 | 4.9 | 5 | 5.2 |
| Tensile strength (MPa) | 25 | 34 | — | — | — | — | — |

From Table 1, it is seen that the TFE/VdF copolymer is high in withstanding voltage as compared with the VdF homopolymer.

Example 6

A film capacitor was produced by deposition of aluminum at a peripheral speed of 100 m on a 600 m wide and 200 m long film formed in the same manner as in Example 2 with vacuum vapor deposition equipment available from ULVAC Inc. (high frequency induction heating type vacuum vapor deposition equipment). Patterning was conducted with a margin of 1 mm and a deposition width of 29 mm.

Resistance measured with a surface resistance meter (Loresute AP available from MITSUBISHI CHEMICAL CORPORATION) was 5Ω.

Example 7

To 50 parts by mass of DMAc (dimethyl acetamide) were added 50 parts by mass of strontium titanate (ST-03 available from SAKAI CHEMICAL INDUSTRY CO., LTD.) and 1 part by mass of KR55 (available from AJINOMOTO CO., INC.) as a titanate coupling agent.

This mixture and glass beads (GB503M available from Potters-Ballotini Co., Ltd.) in the same mass amount as that of the mixture were poured in a three drum type sand grinder (A.VIEX available from AIMEX), followed by 60-minute dispersing treatment at room temperature at 1,000 rpm. After the dispersing treatment, the mixture was passed through a stainless steel mesh to remove glass beads.

This dispersion of strontium titanate was added to 20% by mass DMAc/MIBK solution (6/4 in volumetric ratio) of the fluorine-containing resin 2 so that the strontium titanate content became 175% by mass based on the fluorine-containing resin 2. Then the obtained mixture was coated on an aluminum substrate with a bar coater, and thereafter, a highly dielectric film of the present invention was prepared in the same manner as in Example 1, and physical properties were measured. The results are shown in Table 2.

Example 8

A dispersion of a strontium titanate/barium titanate mixture was prepared in the same manner as in Example 7 except that a mixture of strontium titanate/barium titanate (BT01 available from SAKAI CHEMICAL INDUSTRY CO., LTD.) of 9/1 (mass ratio) was used instead of strontium titanate. Then, this dispersion was added to 20% by mass DMAc/MIBK solution (6/4 in volumetric ratio) of the fluorine-containing resin 2 so that the strontium titanate/barium titanate mixture content became 175% by mass based on the fluorine-containing resin 2. The obtained mixture was coated on an aluminum substrate with a bar coater, and thereafter, a highly dielectric film of the present invention was prepared in the same manner as in Example 1, and physical properties were measured. The results are shown in Table 2.

TABLE 2

|  | Example | |
| --- | --- | --- |
|  | 7 | 8 |
| Withstanding voltage (V/μm) | 250 | 240 |
| Dielectric constant | 35 | 40 |
| Dielectric loss | 2.0 | 2.0 |
| Film thickness (μm) | 5.5 | 5.8 |

From Table 2, it is seen that dielectric constant is improved by blending highly dielectric inorganic fine particles such as strontium titanate.

Example 9

The fluorine-containing resin 2 prepared in Synthesis Example 2 was dissolved in MEK to prepare a solution having a concentration of 25% by mass. This solution was coated on polyester (PET), and after drying at 140° C. for one hour, an obtained film was peeled to give a highly dielectric film of the present invention. The thickness was 80 μm.

This highly dielectric film was uniaxially stretched by four times under the conditions of a stretching direction (MD: direction of film flow, TD: vertical direction to film flow), winding speed (mm/min) and temperature shown in Table 3 with automatic biaxial stretching machine (available from IMOTO MACHINERY CO., LTD.), and the thickness after the stretching was measured. The results are shown in Table 3.

TABLE 3

|  | Stretching conditions | | | |
| --- | --- | --- | --- | --- |
| Experiment No. | Direction | Speed (mm/min) | Temperature (° C.) | Thickness after stretching (μm) |
| 9-1 | MD | 300 | room temperature | cut |
| 9-2 | MD | 100 | room temperature | 20 |
| 9-3 | TD | 2,000 | 70 | 20 |
| 9-4 | TD | 2,000 | 90 | 20 |

From Table 3, it is seen that the stretching is conducted preferably at a temperature of not less than 70° C. rather than at room temperature and the film can be made thin by uniaxial stretching.

Example 10

The fluorine-containing resin 2 prepared in Synthesis Example 2 was heated and melted at 180° C. and was then coated on a stainless steel sheet, and after cooling down to room temperature over one hour, an obtained film was peeled to give a highly dielectric film of the present invention. The film thickness was 80 μm.

This highly dielectric film was uniaxially stretched at 90° C. at a winding speed of 2,000 mm/min at a multiplying factor shown in Table 4 in the stretching direction of MD and then in the direction of TD with automatic biaxial stretching machine (available from IMOTO MACHINERY CO., LTD.), and the thickness after the biaxial stretching was measured. The results are shown in Table 4.

TABLE 4

|  | Stretching conditions | | |
| --- | --- | --- | --- |
| Experiment No. | Direction | Multiplying factor | Thickness after stretching (μm) |
| 10-1 | MD | 2.5 | 16 |
|  | TD | 2.0 |  |
| 10-2 | MD | 3.0 | 10 |
|  | TD | 2.5 |  |

From Table 4, it is seen that the film can be made thin by the biaxial stretching.

INDUSTRIAL APPLICABILITY

The film for a film capacitor of the present invention has highly dielectric property and high withstanding voltage and can be made thin.

The invention claimed is:

1. A film capacitor prepared by laminating an electrode layer on at least one surface of the highly dielectric film, said highly dielectric film is prepared by a coating method and is formed by using (A) a fluorine-containing resin of a copolymer comprising 60 to 82% by mole of vinylidene fluoride unit and 18 to 40% by mole of tetrafluoroethylene unit.

2. The film capacitor of claim 1, comprising (B) at least one kind of polymer selected from the group consisting of polyvinylidene fluoride, vinylidene fluoride/hexafluoropropylene copolymer, polycarbonate, polyethylene oxide, polypropylene oxide, poly(meth)acrylate and polyvinyl acetate.

3. The film capacitor of claim 1, comprising (C) silica in an amount of 0.01 to 10 parts by mass based on 100 parts by mass of the fluorine-containing resin (A).

\* \* \* \* \*